United States Patent
Chen et al.

(10) Patent No.: US 10,914,368 B2
(45) Date of Patent: Feb. 9, 2021

(54) BALL SCREW WITH FORCE SENSOR IN RADIAL DIRECTION

(71) Applicant: Industrial Technology Research Institute, Hsinchu (TW)

(72) Inventors: Chih-Yuan Chen, Taipei (TW); Chung-Yuan Su, Tainan (TW); Chien-Nan Yeh, Tainan (TW); Chao-Ta Huang, Hsinchu (TW); Yu-Wen Hsu, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 182 days.

(21) Appl. No.: 16/221,615

(22) Filed: Dec. 17, 2018

(65) Prior Publication Data
US 2020/0025281 A1 Jan. 23, 2020

(30) Foreign Application Priority Data
Jul. 20, 2018 (TW) .............................. 107125126 A (51) Int. Cl.
*F16H 25/22* (2006.01)
*F16H 57/01* (2012.01)
*G01L 5/00* (2006.01)

(52) U.S. Cl.
CPC ......... *F16H 57/01* (2013.01); *F16H 25/2204* (2013.01); *G01L 5/0061* (2013.01)

(58) Field of Classification Search
CPC ..... G01L 1/04; G01L 1/06; G01L 1/16; G01L 1/2218; G01L 1/2206; G01L 5/0019; G01L 5/0009; G01L 5/0004; G01L 5/0061
See application file for complete search history.

(56) References Cited

U.S. PATENT DOCUMENTS

| | | | | |
|---|---|---|---|---|
| 4,412,456 A | * | 11/1983 | Wilhelm | ................. B21J 13/00 73/768 |
| 5,284,062 A | * | 2/1994 | Ryffel | ................. G01L 5/0004 73/768 |

(Continued)

FOREIGN PATENT DOCUMENTS

| CN | 1693863 | 11/2005 |
|---|---|---|
| CN | 204512339 | 7/2015 |

(Continued)

OTHER PUBLICATIONS

Machine Translation of DE 10 2016 012 564, obtained Jul. 31, 2020.*

(Continued)

*Primary Examiner* — Richard W Ridley
*Assistant Examiner* — Brian J McGovern
(74) *Attorney, Agent, or Firm* — JCIPRNET (57) ABSTRACT

A ball screw with force sensor in radial direction including a screw rod, a screw nut, a plurality of balls, and a force sensor is provided. The screw nut has a cavity. The cavity is extended along a radial direction from an outer surface of the screw nut. The force sensor is disposed in the cavity of the screw nut, and the force sensor includes a stationary base and an elastic component. The stationary base includes a displacement restraint, and the elastic component includes a contact end and a fixed end. The displacement restraint is coupled to the cavity to prevent the stationary base from being displaced in the radial direction for fixing stationary base firmly in the cavity. The fixed end is connected to the stationary base, and the contact end contacts a bottom surface of the cavity in order to sense a force along the radial direction.

35 Claims, 11 Drawing Sheets

(56) References Cited

U.S. PATENT DOCUMENTS

| | | | | |
|---|---|---|---|---|
| 5,783,751 A | * | 7/1998 | Maw | G01L 5/0004 73/761 |
| 9,145,958 B2 | | 9/2015 | Jeng et al. | |
| 9,464,703 B2 | | 10/2016 | Jeng et al. | |
| 9,593,987 B2 | | 3/2017 | Tsai et al. | |
| 9,778,118 B2 | * | 10/2017 | Campbell | G01N 25/00 |
| 2014/0165759 A1 | | 6/2014 | Jeng et al. | |
| 2014/0229125 A1 | | 8/2014 | Cheng et al. | |
| 2015/0020628 A1 | | 1/2015 | Jeng et al. | |
| 2015/0096396 A1 | | 4/2015 | Jeng et al. | |
| 2015/0096397 A1 | | 4/2015 | Jeng et al. | |
| 2015/0377719 A1 | | 12/2015 | Tsai et al. | |
| 2019/0204064 A1 | * | 7/2019 | Chen | F16H 25/2209 |

FOREIGN PATENT DOCUMENTS

| | | | | |
|---|---|---|---|---|
| CN | 105829847 | | 8/2016 | |
| CN | 106959132 | | 7/2017 | |
| DE | 102009038087 | | 2/2011 | |
| DE | 102012005614 A1 | * | 9/2013 | F16B 31/02 |
| DE | 102016210284 | | 12/2017 | |
| DE | 102016012564 A1 | * | 4/2018 | G01L 1/162 |
| JP | 2007333195 | | 12/2007 | |
| JP | 2013200032 | | 10/2013 | |
| TW | 201043809 | | 12/2010 | |
| TW | 201204960 | | 2/2012 | |
| TW | 201337233 | | 9/2013 | |
| TW | I407026 | | 9/2013 | |
| TW | 201416586 | | 5/2014 | |
| TW | 201422946 | | 6/2014 | |
| TW | 201443353 | | 11/2014 | |
| TW | 201504544 | | 2/2015 | |
| TW | I482919 | | 5/2015 | |
| TW | 201545832 | | 12/2015 | |
| TW | I513927 | | 12/2015 | |
| TW | I544164 | | 8/2016 | |
| TW | I572797 | | 3/2017 | |
| TW | 201712253 | | 4/2017 | |

OTHER PUBLICATIONS

Machine Translation of DE 10 2012 005 614, obtained Jul. 31, 2020.*

Hans-Christian Mohring et al., "Integrated autonomous monitoring of ball screw drives", CIRP Annals—Manufacturing Technology 61, Apr. 2012, pp. 355-358.

S. Biehl et al., "Thin Film Sensors for Condition Monitoring in Ball Screw Drives", 1st Joint International Symposium on System-Integrated Intelligence 2012: New Challenges for Product and Production Engineering, Jun. 2012, pp. 59-61.

Guo-Hua Feng et al., "Embedded temperature and vibration sensing system for monitoring ball screw preload", Proceedings of 2011 8th Asian Control Conference (ASCC), May 2011, pp. 171-174.

"Office Action of Taiwan Counterpart Application", dated Jan. 28, 2019, p. 1-p. 3.

"Office Action of China Counterpart Application", dated Jun. 30, 2020, p. 1-p. 7.

* cited by examiner

BALL SCREW WITH FORCE SENSOR IN RADIAL DIRECTION

CROSS-REFERENCE TO RELATED APPLICATION

This application claims the priority benefits of Taiwan application serial no. 107125126, filed on Jul. 20, 2018. The entirety of the above-mentioned patent application is hereby incorporated by reference herein and made a part of this specification.

TECHNICAL FIELD

The disclosure relates to a ball screw, and in particular to a ball screw with force sensor in radial direction.

BACKGROUND

A ball screw is a transmission mechanical component that mounts a steel ball between a screw nut and a screw rod and converts the rotary movement of the steel ball in the screw nut into a linear movement. The ball screw has the characteristics of high precision, long service life, etc., and can perform functions such as high-speed forward transmission and reverse transmission.

Based on the various processing requirements for precision and miniaturization of the existing complex processing machine, it is possible to monitor the preload change of the ball screw in real time, which has become the key technology for developing the next generation of smart ball screw because the controller of the ball screw is able to make the ball screw to perform high-precision feed control and predict the failure of the ball screw after automatically obtaining the instantaneous information of the preload change of the ball screw.

The existing ball screw senses the preload of the ball screw through a force sensor installed in the screw nut, thereby determining whether the accuracy of the ball screw is erroneous. Since the direction of thrust of the motor is the same as the axial direction of sensing the preload of the ball screw, the axial force sensor in the screw nut can only measure the combined force of the thrust of the motor and the preload of the ball screw, but cannot separately obtain the thrust value of the motor and the preload value of the ball screw, which affects the measuring accuracy of the preload of the ball screw.

SUMMARY

Embodiments of the disclosure provide a ball screw with force sensor in radial direction, which may prevent the axial thrust generated externally from affecting the sensing of the preload in radial direction by the ball screw, thereby improving the measuring accuracy of the preload of the ball screw.

In the disclosure, a ball screw with force sensor in radial direction includes a screw rod, a screw nut, a plurality of balls and a force sensor. The outer surface of the screw rod has an outer groove, and the screw rod extends along an axial direction. The screw nut has an inner surface and an outer surface. The inner surface of the screw nut has an inner groove and the screw nut has a cavity extending along a radial direction from the outer surface of the screw nut. The screw nut is sleeved on the screw rod such that the screw nut is movable along the radial direction. A plurality of balls are disposed between the outer groove and the inner groove. The force sensor is disposed in the cavity of the screw nut and includes a stationary base and an elastic component. The stationary base includes a displacement restraint. The elastic component includes a contact end and a fixed end, and at least one strain sensor is disposed on the elastic component. The displacement restraint is coupled to the cavity to prevent the stationary base from being displaced in the radial direction.

In the disclosure, a ball screw with force sensor in radial direction includes a screw rod, a screw nut, a plurality of balls and a force sensor. The outer surface of the screw rod has an outer groove, and the screw rod extends along an axial direction. The screw nut has an inner surface and an outer surface. The inner surface of the screw nut has an inner groove and the screw nut has a cavity extending along the radial direction from the outer surface of the screw nut. The screw nut is sleeved on the screw rod such that the screw nut is moveable along the radial direction. A plurality of balls are disposed between the outer groove and the inner groove. The force sensor is disposed in the cavity of the screw nut and includes a stationary base and an elastic component. The stationary base includes a displacement restraint and a plurality of expanding portions. The elastic component includes a contact end, a fixed end and at least one tightening portion, and at least one strain sensor is disposed on the elastic component. The displacement restraint is coupled to the cavity to prevent the stationary base from being displaced in the radial direction. The at least one tightening portion pushes the plurality of expanding portions, such that the plurality of expanding portions press against one side surface of the cavity.

In the disclosure, a ball screw with force sensor in radial direction includes a screw rod, a screw nut, a plurality of balls and a force sensor. The screw nut has an inner surface and an outer surface. The outer surface of the screw rod has an outer groove, and the screw rod extends along an axial direction. The cavity includes a side surface and a bottom surface, the side surface of the cavity has an internal thread, and the screw nut is sleeved on the screw rod such that the screw nut is movable along the axial direction. A plurality of balls are disposed between the outer groove and the inner groove. The force sensor is disposed in the cavity of the screw nut and includes a stationary base and an elastic component. The stationary base includes at least one displacement restraint, at least one rotary restraint and a plurality of expanding portions, and at least one displacement restraint is an external thread. The elastic component includes a contact end, a fixed end and at least one tightening portion, and at least one strain sensor is disposed on the elastic component. The contact end is in contact with the bottom surface. The stiffness of the stationary base along the radial direction is greater than the stiffness of the elastic component along the radial direction. When the elastic component is coupled with the stationary base, the least one rotary restraint is coupled with the elastic component to prevent the elastic component from rotating in the radial direction, and the at least one tightening portion pushes at least one of the plurality of expanding portions, such that the plurality of expanding portions press against the side surface of the cavity.

Several exemplary embodiments accompanied with figures are described in detail below to further describe the disclosure in details.

DESCRIPTION OF EMBODIMENTS

Figure 1A:
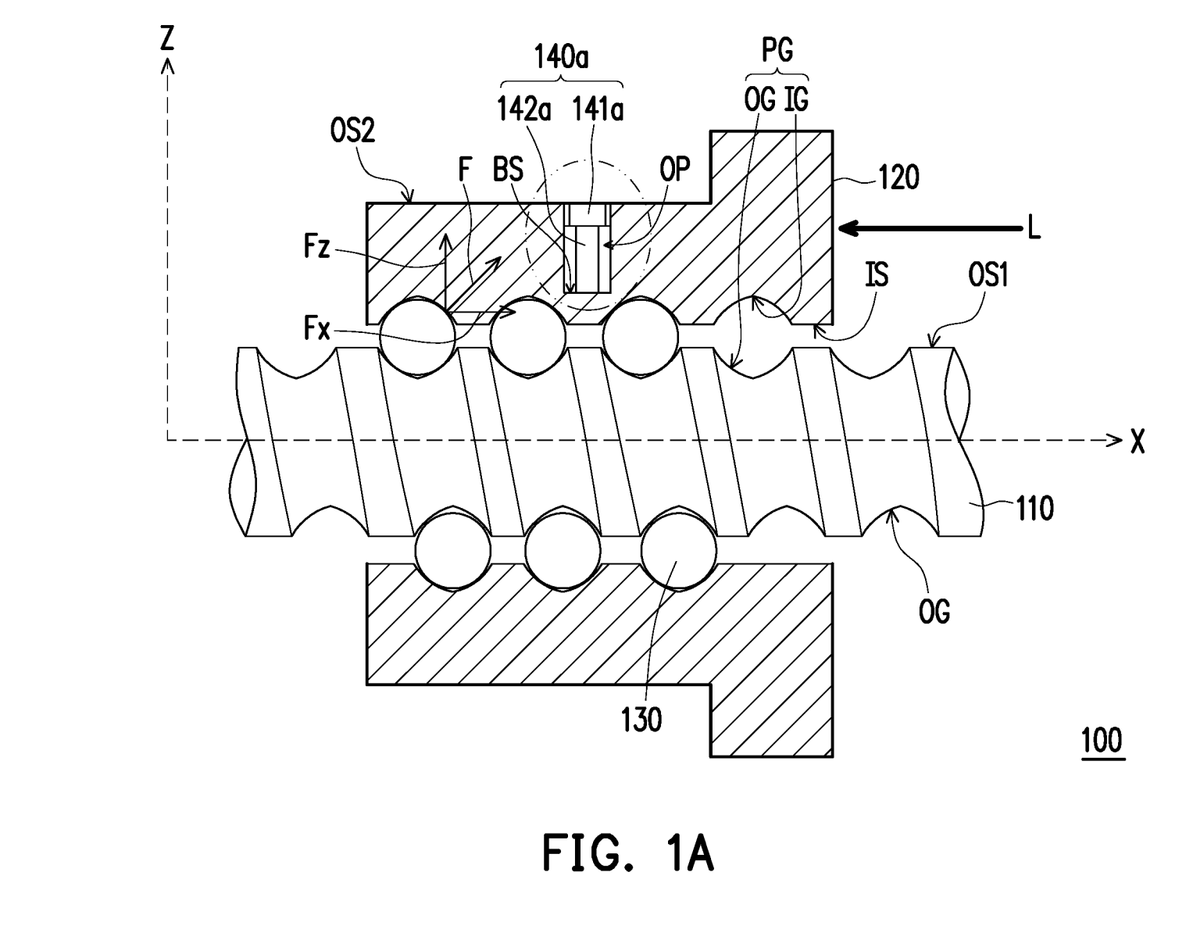
FIG. 1A is a schematic view of a ball screw with force sensor in radial direction according to an embodiment of the disclosure.
Figure 1B:
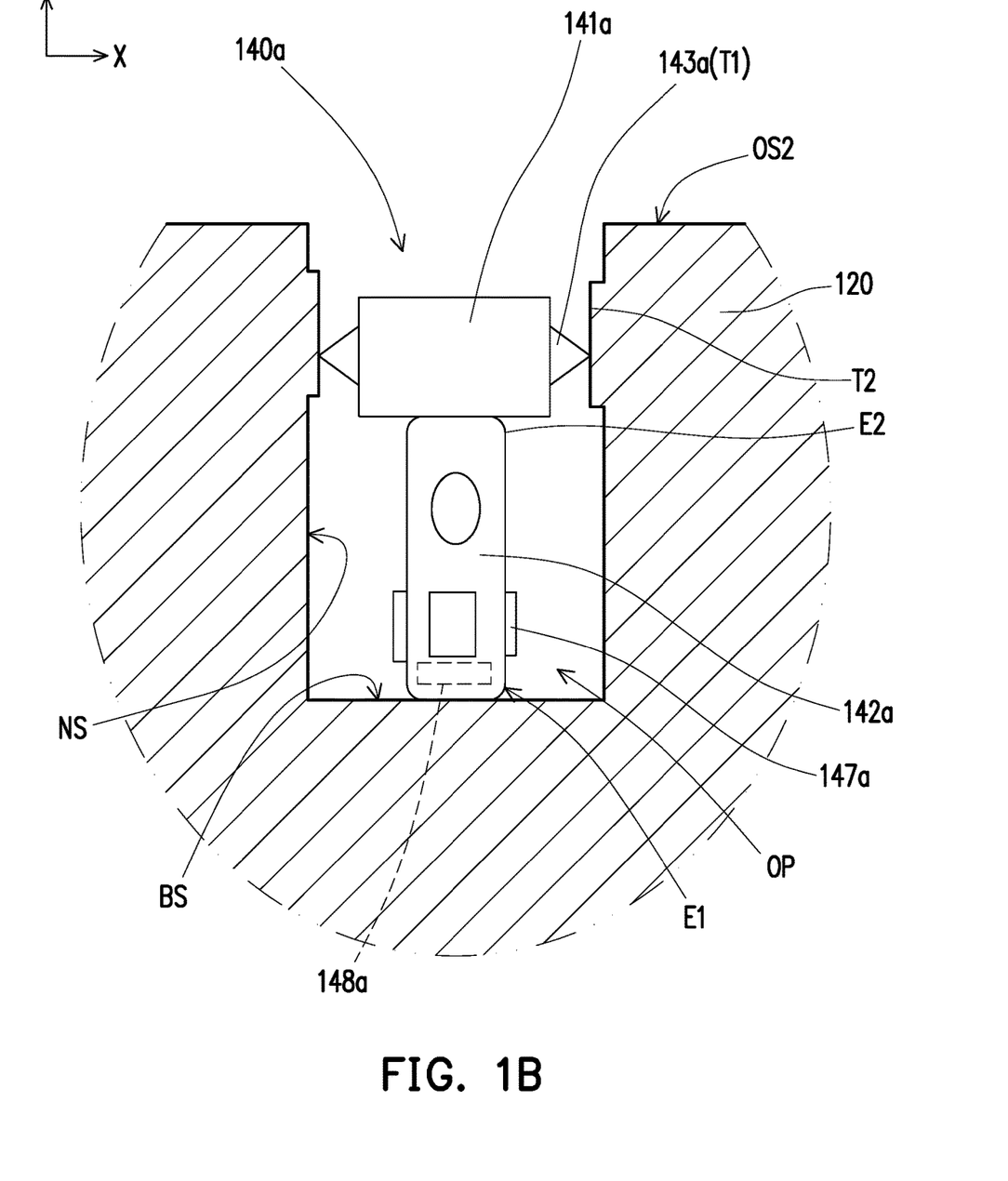
FIG. 1B is a schematic view of partial enlargement of the ball screw with force sensor in radial direction in FIG. 1A.

FIG. 1A is a schematic view of a ball screw with force sensor in radial direction according to an embodiment of the disclosure. FIG. 1B is a schematic view of partial enlargement of the ball screw with force sensor in radial direction in FIG. 1A.

Referring to FIG. 1A and FIG. 1B, a ball screw 100 with force sensor in radial direction Z which is perpendicular to the axial direction X in the disclosure includes a screw rod 110, a screw nut 120, a plurality of balls 130, and a force sensor 140a. The outer surface OS1 of the screw rod 100 has an outer groove OG, and the screw rod 110 extends linearly along the axial direction X. The screw rod 110 is made of, for example, a metal material. The outer groove OG is, for example, an external thread spirally recessed on the outer surface OS1 of the screw rod 110, and the outer groove OG extends to both ends (not shown) of the screw rod 110.

The screw nut 120 is rotationally sleeved on the screw rod 110. The screw nut 120 has a cavity OP. The cavity OP is recessed into the screw nut 120, and the cavity OP extends from the outer surface OS2 of the screw nut 120 along a radial direction Z perpendicular to the axial direction X. The inner surface IS of the screw nut 120 has an inner groove IG. The inner groove IG is, for example, an internal thread spirally recessed on the inner surface IS. The inner groove IG of the screw nut 120 corresponds to the outer groove OG of the screw rod 110, so that the inner groove IG and the outer groove OG construct the channel PG. Further, a reflow component is disposed in the screw nut 120 and has a first opening (not shown) and a second opening (not shown) corresponding to the channel PG.

The plurality of balls 130 are disposed between the outer groove OG and the inner groove IG, and each of the balls 130 respectively contacts the outer groove OG of the screw rod 110 and the inner groove IG of the screw nut 120. When an external force is applied along the axial direction X to the ball screw 100 with force sensor in radial direction and causes the screw nut 120 to rotate with respect to the screw rod 110, each of the balls 130 is able to roll in the channel PG and enters the reflow component from the first opening, and then leaves the reflow component from the second opening, such that the plurality of balls 130 may roll continuously in the channel PG. Therefore, by continuous rolling of the plurality of balls in the channel PG, the screw nut 120 can move linearly on the screw rod 110 along the axial direction X while the screw nut 120 rotates with respect to the screw rod 110.

Referring to FIG. 1A and FIG. 1B, a force sensor 140a is disposed in the cavity OP of the screw nut 120. The force sensor 140a includes a stationary base 141a and an elastic component 142a. The stationary base 141a includes a displacement restraint 143a, and the displacement restraint 143a is coupled to the side surface NS of the cavity OP to restraint the displacement of the stationary base 141a in the radial direction Z, thereby fixing the stationary base 141a in the cavity OP of the screw nut 120. The elastic component 142a includes a contact end E1 and a fixed end E2. The elastic component 142a is connected to the stationary base 141a through the fixed end E2, and the contact end E1 contacts the bottom surface BS of the cavity OP. Specifically, when the screw nut 120 and the screw rod 110 clamp each of the balls 130, each of the balls 130 generates a corresponding preload F. The preload F can be broken into a component force Fx, and a component force Fz at the region where each of the balls 130 contacts the screw nut 120, wherein the component force Fz is transmitted to the screw nut 120 in the radial direction Z. The sum of a plurality of component forces Fz cause the screw nut 120 to deform in the radial direction Z. By measuring the deformation of the screw nut 120 in the radial direction Z, the magnitude of the sum of the component forces Fz can be calculated. Then component forces Fz and the preload F can be calculated. In the embodiment, since the contact end E1 of the elastic component 142a contacts the bottom surface BS of the cavity OP along the radial direction Z and the fixed end E2 is connected to the stationary base 141a, the sum of component forces Fz of the preload F can be sensed when the elastic component 142a is deformed.

According to the embodiment of the disclosure, the stationary base 141a and the elastic component 142a of the force sensor 140a is made of different materials respectively. For example, the stationary base 141a is made of a metal material with high stiffness because the stationary base 141a should be restrained in the cavity OP of the screw nut 120 to prevent the stationary base 141a being displaced in the radial direction Z. Since the elastic component 142a pushes the bottom surface BS of the cavity OP. A plurality of the component forces Fz of the preload F is transmitted to the elastic component 142a through the bottom surface BS of the cavity OP in the screw nut 120, such that the elastic component 142a is deformed. Therefore, the force sensor 140a can obtain the magnitude of the sum of the plurality of the component forces Fz of the preload F according to the deformation amount of the elastic component 142a. In addition, in order to increase the measuring sensitivity of the force sensor 140a, the elastic component 142a could be made of a material with a low stiffness along radial direction, and the stationary base 141a could be made of a material with a high stiffness along radial direction. Therefore, when the stiffness of the elastic component 142a along the radial direction Z is less than the stiffness of the stationary base 141a along the radial direction Z, the measuring sensitivity of the force sensor 140a is improved.

In another embodiment, the stationary base 141a has the same material property as the elastic component 142a, and the stationary base 141a and the elastic component 142a are an integrally molded structure. For example, the integrally molded structure is made by injection molding, transfer molding, hot press molding or other molding process. In the embodiment, by changing the structure of the integrally molded structure, the stiffness of the elastic component 142a along the radial direction Z could be smaller than that of the stationary base 141a along the radial direction Z to increase the measuring sensitivity of the force sensor 140a. For example, the elastic component 142a is a hollow structure in the radial direction or a tubular structure with a cavity in the tube wall, and the stationary base 141a is a solid structure.

To illustrate the function of the force sensor 140a in more details, please refer to FIG. 1B. In the embodiment, the force sensor 140a is fixed in the cavity OP of the screw nut 120. The stationary base 141a includes a displacement restraint 143a that can fix the force sensor 140a in the cavity OP. When the displacement restraint 143a is coupled with the cavity OP, the displacement of the stationary base 141a in the radial direction Z is restricted. For example, the displacement restraint 143a is an external thread (not shown) that surrounds the position T1 on the stationary base 141a. In addition, the position T2 on the side surface NS of the cavity OP of the screw nut 120 has an internal thread (not shown). When the stationary base 141a is coupled with the cavity OP, the external thread of the position T1 on the stationary base 141a is coupled with the internal thread of the position T2 on the side surface NS of the cavity OP. Thereby the displacement of the stationary base 141a is restricted in the radial direction Z, and the stationary base 141a is fixed in the cavity OP of the screw nut 120.

Specifically, the force sensor 140a includes a first strain sensor 147a and a second strain sensor 148a. The first strain sensor 147a is disposed on an outer surface of the elastic component 142a. The second strain sensor 148a is disposed on the inner surface of the bottom of the elastic component 142a. When the screw nut 120 is subjected to the plurality of the component forces Fz of the preload F, the first strain sensor 147a or the second strain sensor 148a can sense the deformation of the screw nut 120 in the radial direction Z, and convert the deformation into electrical signal to be transmitted to an application specific integrated circuit (ASIC) chip (not shown) to calculate the magnitude of the preload F.

Figure 2A:
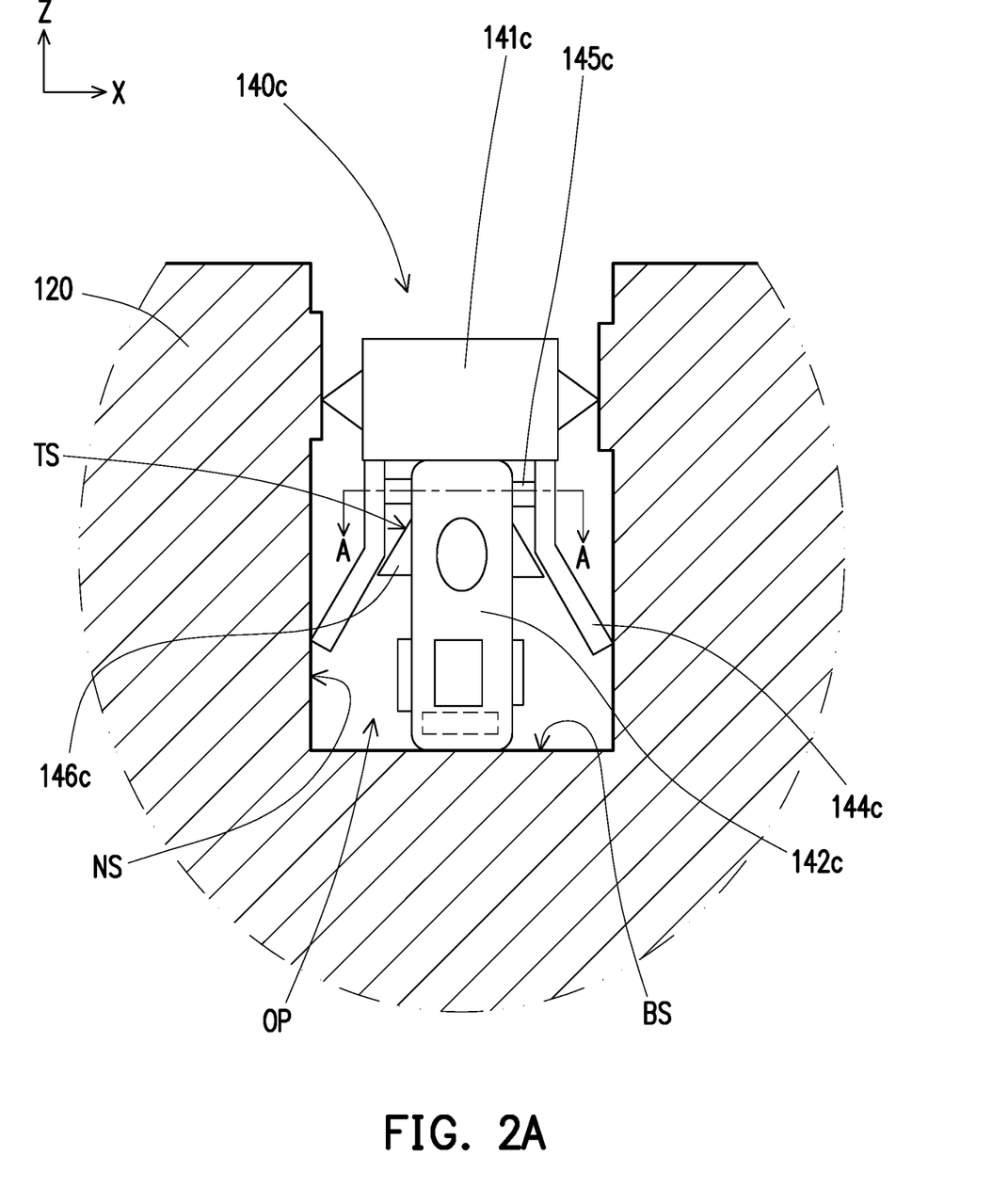
FIG. 2A is a schematic view of partial enlargement of the ball screw with force sensor in radial direction in FIG. 1A using a force sensor in another embodiment fixed in a screw nut.
Figure 2B:
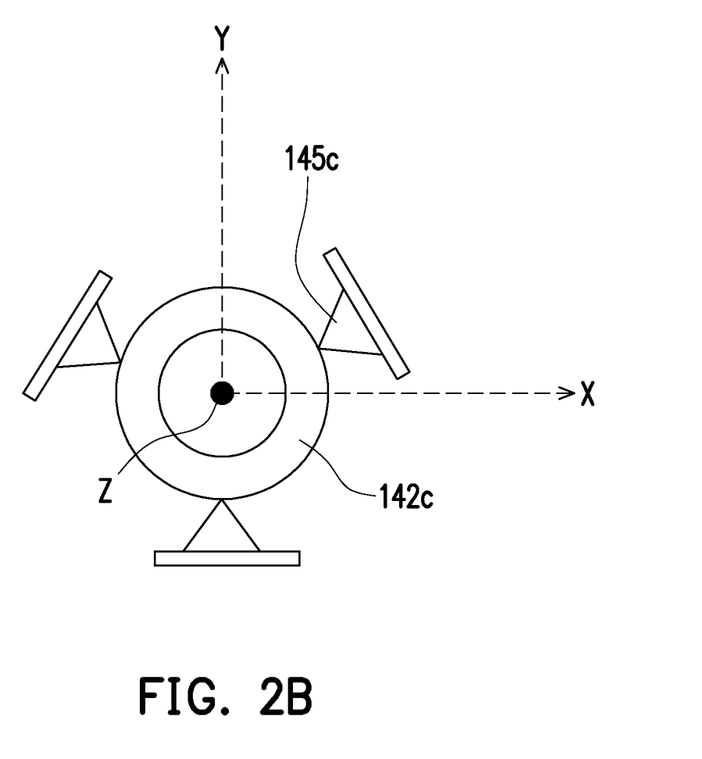
FIG. 2B is a schematic view of the force sensor in FIG. 2A taken along a cross section AA.

FIG. 2A is a schematic view of partial enlargement of another embodiment of the disclosure. The ball screw (not shown) with force sensor in radial direction in FIG. 2A is similar to the ball screw with force sensor in radial direction in FIG. 1B. However, the force sensor 140c in FIG. 2A is different from the force sensor 140a of FIG. 1B. FIG. 2B is a schematic structural view of the force sensor 140c in FIG. 2A taken along a cross section AA.

Referring to FIG. 2A, the structure of the force sensor 140c of the embodiment is similar to the structure of the force sensor 140a of FIG. 1B. The difference between the two structures of the force sensors is that the elastic component 142c further includes a plurality of tightening portions 146c and the stationary base 141c further includes a plurality of expanding portions 144c. When the elastic component 142c is coupled to the stationary base 141c, at least one of the plurality of tightening portion 146c pushes at least one of the plurality of expanding portions 144c, such that the at least one of the plurality of expanding portions 144c press against the side surface NS of the cavity OP. Specifically, the plurality of expanding portions 144c are a plurality of pillars extending along the radial direction Z, and at least one gap is formed between any two adjacent pillars (shown in FIGS. 2A, 2B). The tightening portion 146c is a structure having an inclined surface TS and extending in the radial direction Z. When the stationary base 141c is coupled with the elastic component 142c, the tightening portion 146c with the inclined surface TS pushes the pillar, and guides the plurality of pillars through the inclined surface TS, such that the plurality of pillars are expanded outward to tightly contact the side surface NS of the cavity OP. In this manner, the force sensor 140c is firmly fixed in the cavity OP to prevent the external thread (not shown) on the stationary base 141c and the internal thread (not shown) on the side surface NS of the cavity OP from coupling loosely.

The stationary base 141c includes at least one rotary restraint 145c. In the embodiment, the number of the at least one rotary restraint 145c is three and they are disposed on the corresponding expanding portion 144c. In another embodiment, the number of the at least one rotary restraint 145c is one, two or more depending on the requirements of design. In the embodiment, the three rotary restraints 145c are coupled to the elastic component 142c to prevent the elastic component 142c from rotating in the radial direction Z, thereby preventing the elastic component 142c from being displaced in radial direction Z due to rotation along the radial direction Z. If the elastic component 142c is displaced in the radial direction Z due to the rotation in the radial direction Z, the force sensor 140c cannot measure the preload F of the ball screw correctly. In other words, when the rotary restraint 145c is coupled with the elastic component 142c, the accuracy of the preload F measured by the force sensor 140c can be improved.

Figure 2C:
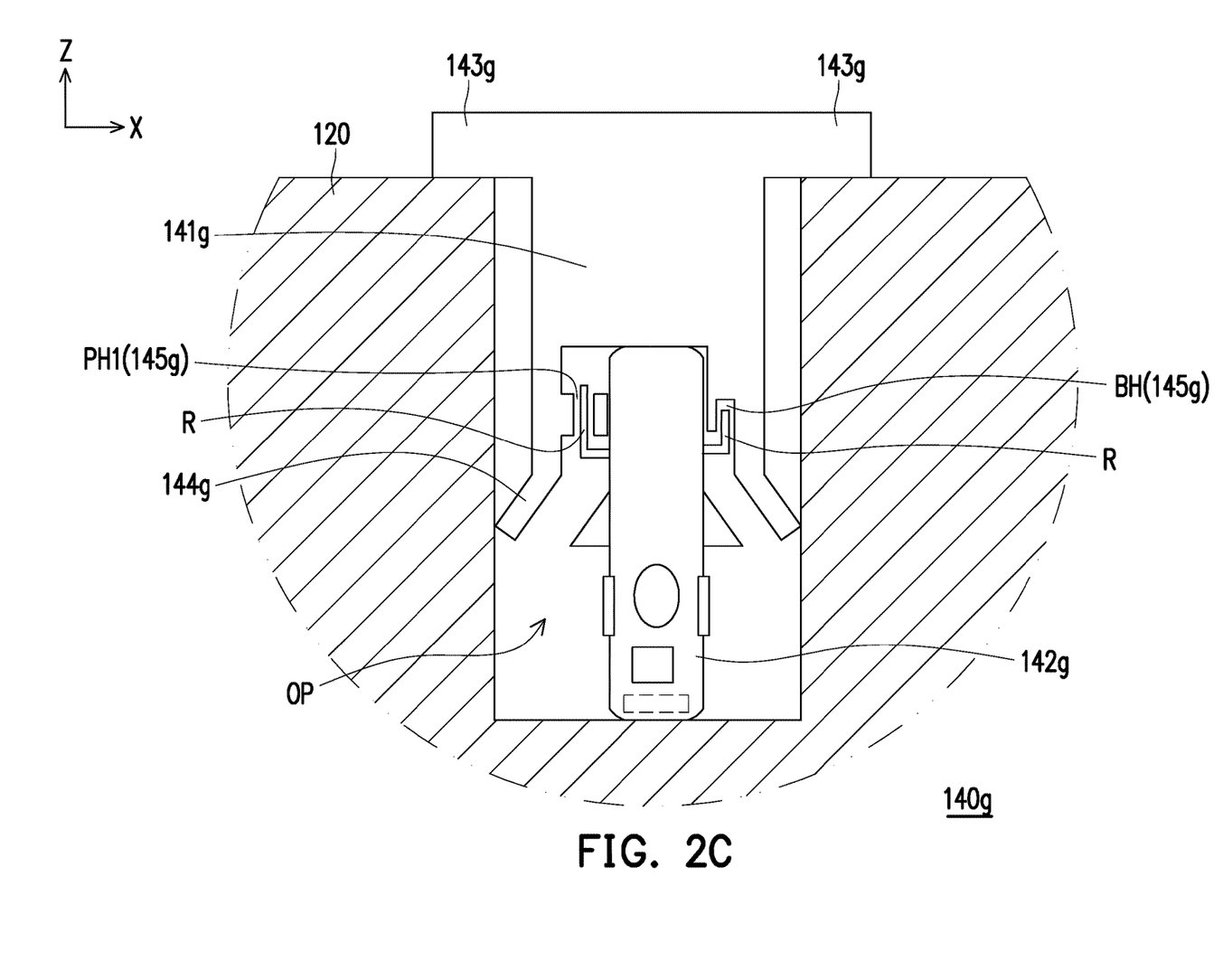
FIG. 2C is a schematic view of the force sensor in another embodiment of the disclosure in which the displacement restraints and rotary restraints are different from those in the previous embodiment.

FIG. 2C is a schematic view of the force sensor in another embodiment of the disclosure in which the displacement restraints and rotary restraints are different from those in the previous embodiment.

Referring to the embodiment of FIG. 2C, the structure of the force sensor 140g is similar to that of the force sensor 140c of FIG. 2A. The difference between the two is that the stationary base 141g of the force sensor 140g includes different displacement restraint 143g and different rotary restraint 145g. For example, in the embodiment, the displacement restraint 143g is a stopper. When the stationary base 141g is coupled to the cavity OP of the screw nut 120, the stopper contacts the outer surface of the screw nut 120, thereby the displacement of the stationary base 141g is restricted in the radial direction, and the force sensor 140g is fixed in the cavity OP. Further, in order to prevent the stopper 143g of the stationary base 141g from sliding on the outer surface of the screw nut 120, the stationary base 141g can be fixed on the outer surface of the screw nut 120 by an adhesive or a screw.

On the other hand, in the embodiment, the rotary restraint 145g includes at least one through hole PHI or at least one blind hole BH. The through hole PHI or the blind hole BH is disposed inside the expanding portion 144g and is disposed in the location near the periphery of the elastic component 142g. In addition, the elastic component 142 includes two positioning pillars R. In the embodiment, the two positioning pillars R are respectively coupled with the through hole PHI or the blind hole BH of the rotary restraint 145g to prevent the elastic component 142g from rotating with respect to the radial direction Z, and to prevent the elastic components 142g from being displaced in the radial direction Z due to rotation with respect to the radial direction Z.

Figure 3A:
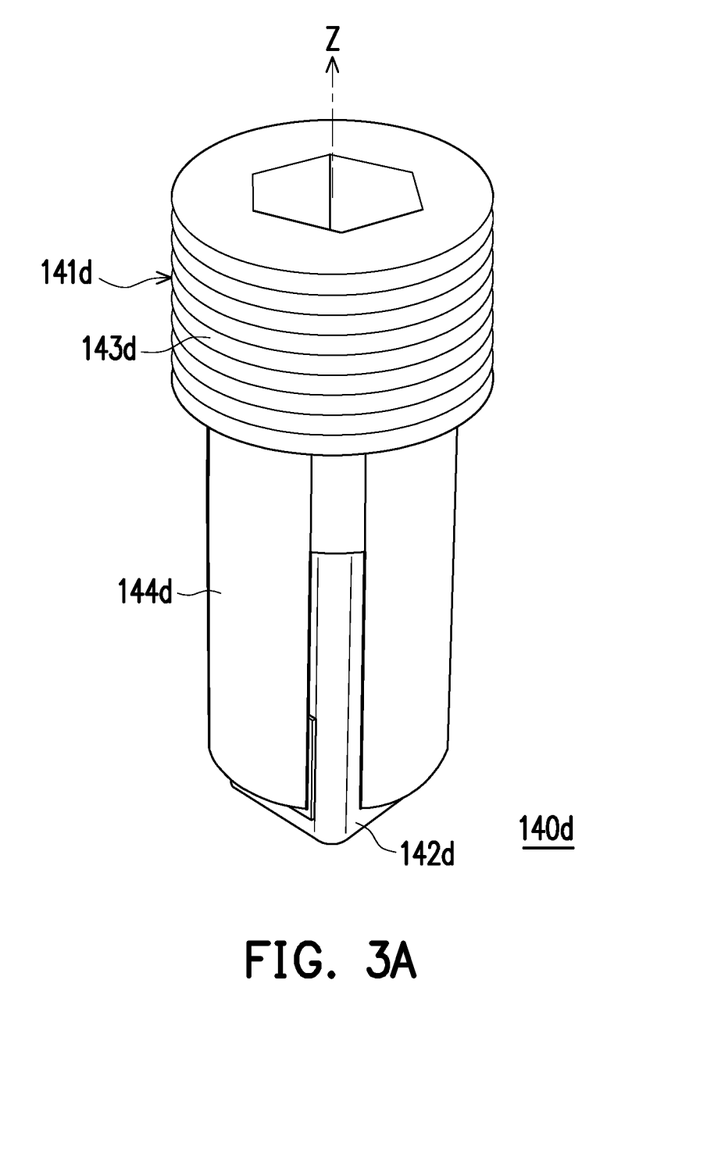
FIG. 3A is a schematic view showing combination of components of the force sensor in another embodiment of the disclosure.
Figure 3B:
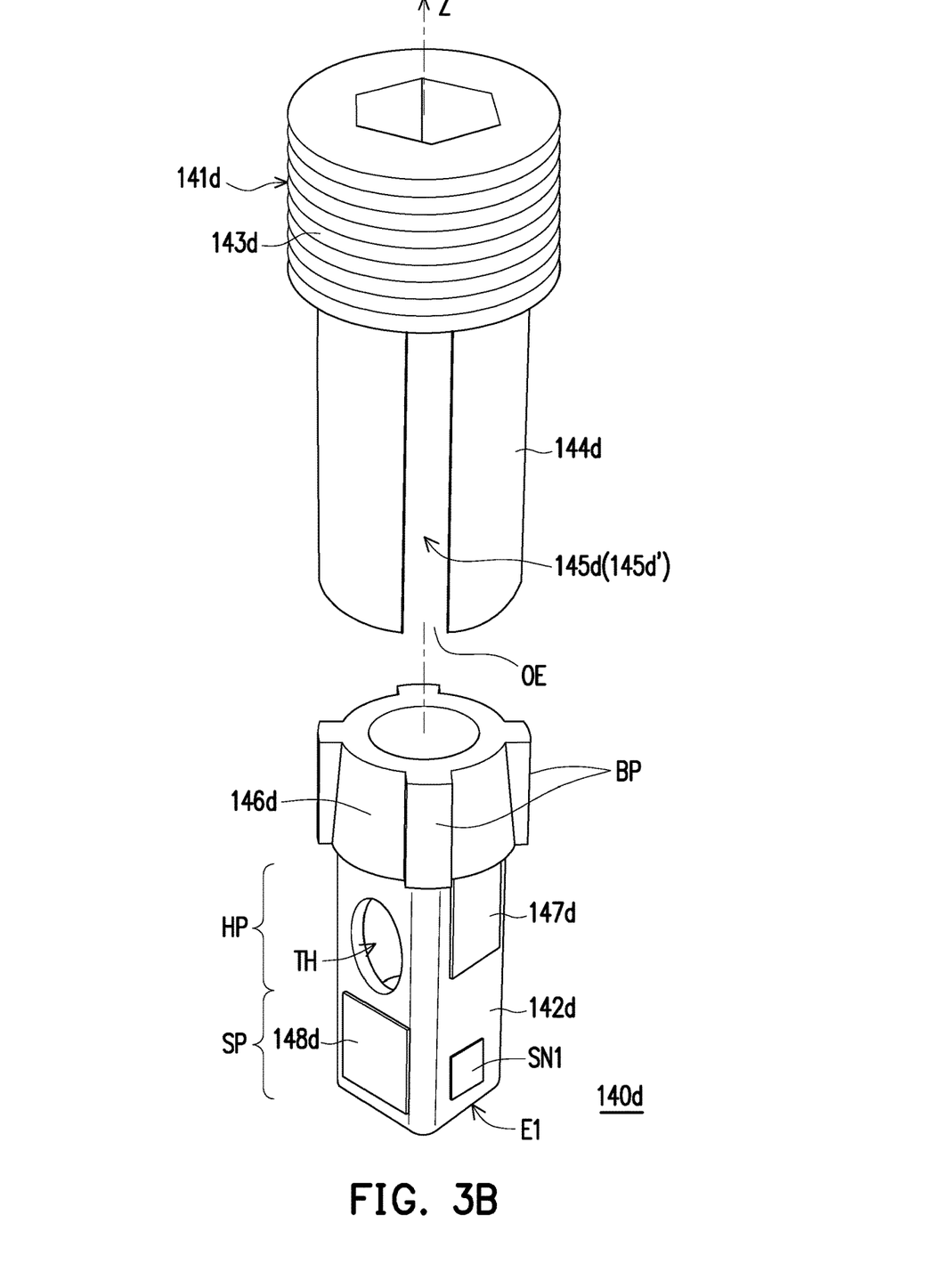
FIG. 3B is a schematic exploded view of the components of the force sensor in FIG. 3A.

FIG. 3A is a schematic view showing the force sensor in another embodiment of the disclosure. FIG. 3B is a schematic exploded view of the components of the force sensor in FIG. 3A.

Referring to FIG. 1B, FIG. 3A and FIG. 3B, the structure of the force sensor 140d of the embodiment is similar to that of the force sensor 140b of FIG. 1B. The difference between the two structures is that the stationary base 141d includes at least one rotary restraint 145d and a displacement restraint 143d. In the embodiment, the number of the at least one rotary restraints is plural, and the rotary restraints are gaps 145d' or grooves (not shown) disposed between the plurality of expanding portions 144d. Each of gaps 145d' has an open ends OE. The elastic component 142d includes a plurality of tightening portions 146d with an inclined surface TS. A plurality of bumps BP are disposed between the tightening portion 146d. When the elastic component 142d is coupled to the stationary base 141d, each of the bumps BP enters the stationary base 141d from each of the open ends OE and pushes the stationary base 141d. Each of the bumps BP is engaged to the corresponding gap 145d' to prevent the elastic component 142d from rotating with respect to the radial direction Z. After the elastic component 142d is coupled to the stationary base 141d, the force sensor 140d can be coupled into the cavity OP of the screw nut 120 for sensing the preload F. More specifically, the force sensor 140d is fixed in the cavity OP by coupling the external thread of the position T1 of the displacement restraint 143d of the stationary base to the internal thread of the position T2 on the side surface E of the cavity OP. In addition, each of the tightening portions 146d also pushes the plurality of expanding portions 144d to force the plurality of expanding portions 144d to press against the side surface NS of the cavity OP, such that the force sensor 140d is firmly fixed in the cavity OP.

Referring to FIG. 3B, in the embodiment, the force sensor 140d includes an elastic component 142d, a first strain sensor 147d, a second strain sensor 148d, and a temperature sensor SN1. The first strain sensor 147d is disposed in the first region of the elastic component 142d and the second strain sensor 148d is disposed in the second region of the elastic component 142d. When the screw nut 120 is subjected to the preload F, the strain of the first region in radial direction is greater than the strain of the second region in radial direction.

Specifically, the elastic component 142d includes a hollow portion HP having a low radial stiffness and a solid portion SP having a high radial stiffness. The through hole TH is disposed in the wall of the hollow portion HP to further reduce the radial stiffness of the hollow portion HP. In this embodiment, the first region is the hollow portion HP of the elastic component 142d, and the second region is the solid portion SP of the elastic component 142d. The first strain sensor 147d is configured for sensing the deformation of the elastic component 142d in the radial direction Z. The second strain sensor 148d is configured for sensing the thermal deformation of the elastic component 142d induced by the temperature change. Therefore, the first strain sensor 147d can be disposed in the hollow portion HP (a region having a larger radial strain value). Furthermore, for increasing the measuring sensitivity of deformation in the radial direction Z, the first strain sensor 147d can be disposed in a region of the elastic component close to the through hole TH. In order to increase the accuracy of the thermal deformation measurement, the second strain sensor 148d can be disposed on the solid portion SP (a region having a smaller radial strain), such as a region of the elastic component near the contact end E1. The temperature sensor SN1 is disposed on the solid portion SP of the elastic component 142d. The temperature sensor SN1 is configured to sense the temperature change of the elastic component 142d. The first strain sensor 147d, the second strain sensor 148d, and the temperature sensor SN1 can convert the measured strain, the measured thermal deformation, and measured temperature change into electrical signals respectively, and then transmit these electrical signals respectively to the application specific integrated circuit (ASIC) chip (not shown) to calculate the magnitude of the preload F.

Figure 4A:
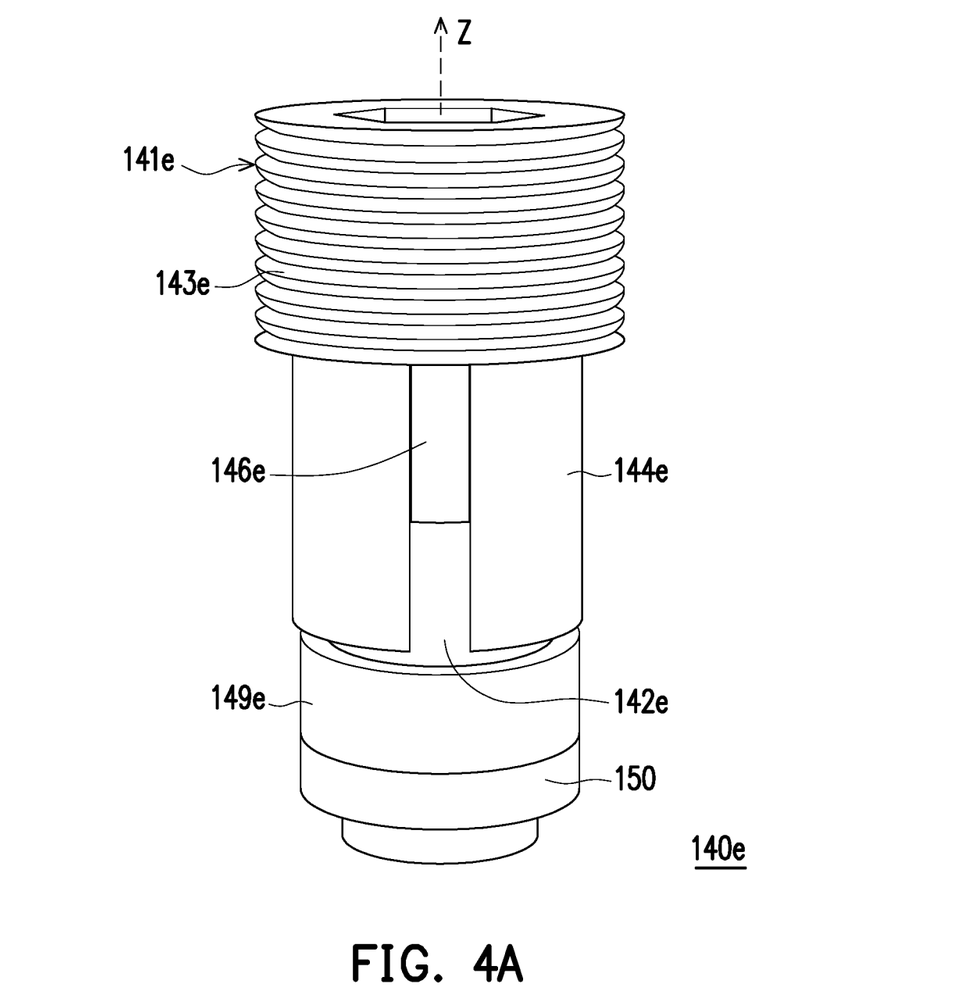
FIG. 4A is a schematic view showing the components of the force sensor in another embodiment of the disclosure.
Figure 4B:
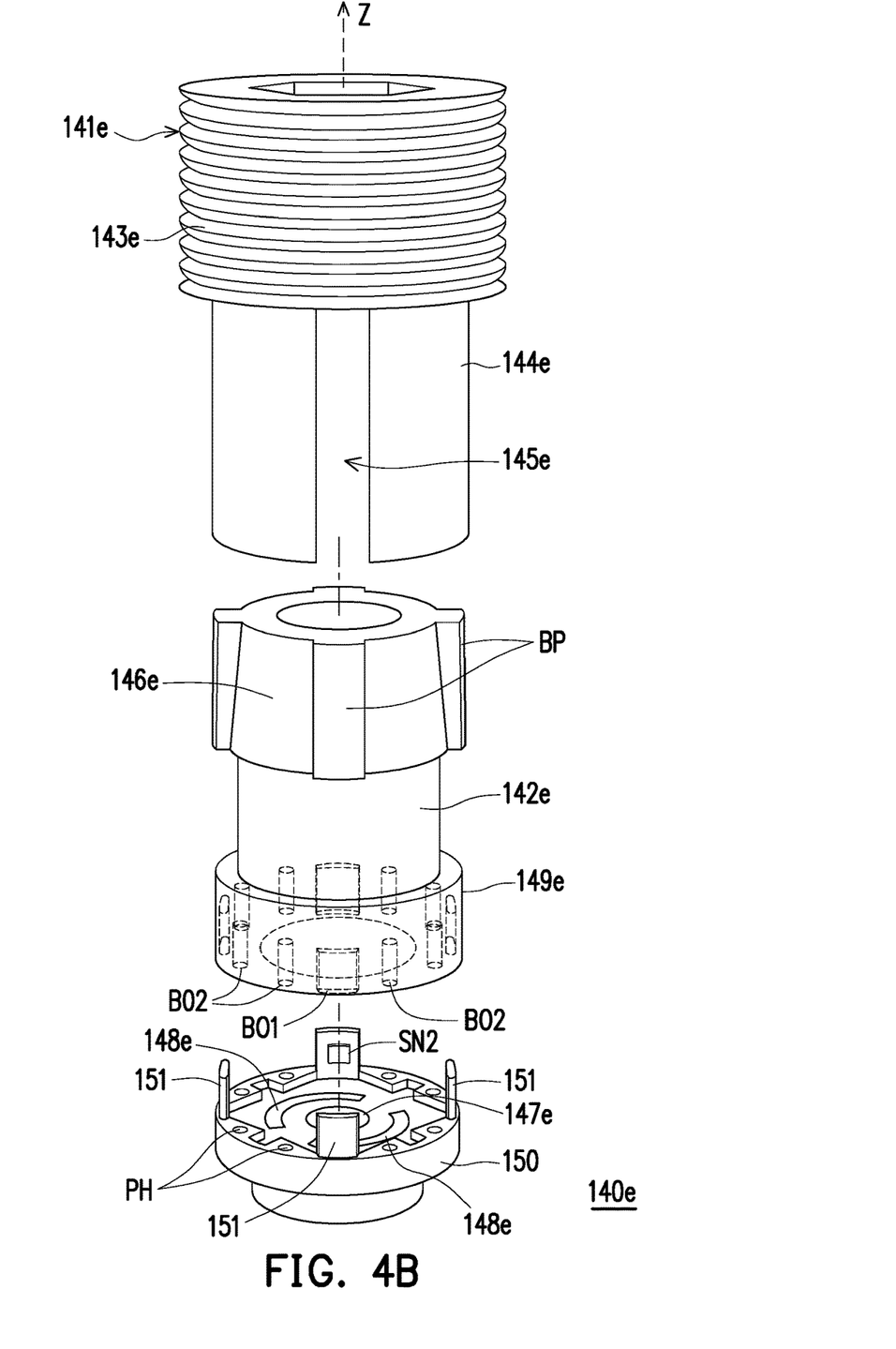
FIG. 4B is a schematic exploded view of the components of the force sensor in FIG. 4A.

FIG. 4A is a schematic view showing the components of the force sensor in another embodiment of the disclosure. FIG. 4B is a schematic exploded view of the components of the force sensor in FIG. 4A.

Referring to FIG. 3B, FIG. 4A and FIG. 4B, a force sensor 140e of the present embodiment has similar structure as that of the force sensor 140d of FIG. 3B. The difference between the two structures is that the first strain sensor 147e, the second strain sensor 148e, and the temperature sensor SN2 are all disposed on the sensing portion 150 of the elastic component 142e. The first strain sensor 147e is disposed in the first region of the elastic component 142d and the second strain sensor 148d is disposed in the second region of the elastic component 142d. When the screw nut 120 is subjected to the preload F, the radial strain value at the first region is greater than the radial strain value at the second region. In the present embodiment, the sensing portion 150 is coupled to the connecting portion 149e of the elastic component 142e such that the sensing portion 150 can be a part of the elastic component 142e, wherein the first region is a circular region at the sensing portion 150, and the second region is a plurality of annular regions at the sensing portion 150. Further, in the embodiment, the displacement restraint 143e on the stationary base 141e is a thread.

The sensing portion 150 includes a plurality of rectangular pillar structures 151 and a plurality of circular through holes PH. The temperature sensor SN2 is disposed on one of the pillar structures 151 of the sensing portion 150. The connecting portion 149e includes a first blind hole BO1 corresponding to the pillar structures 151 and a second blind hole BO2 corresponding to the through hole PH. When the sensing portion 150 is coupled with the connecting portion 149e, each of the pillar structures 151 enters the corresponding first blind hole BO1, such that the sensing portion 150 and the connecting portion 149e are correctly coupled. In other words, the pillar structure 151 is one kind of positioning structure for entering the first blind hole BO1. In addition, a plurality of screws (not shown) can respectively pass through the through holes PH to enter the second blind hole BO2 which has the internal thread to fix the sensing portion 150 to the connecting portion 149e of the elastic component 142e. With the structure design above and assembling steps, the assembly of the first strain sensor 147d and the second strain sensor 148d to the elastic component 142e is simplified significantly. It reduces the assembly time and manufacturing cost of the force sensor 140d.

Figure 5A:
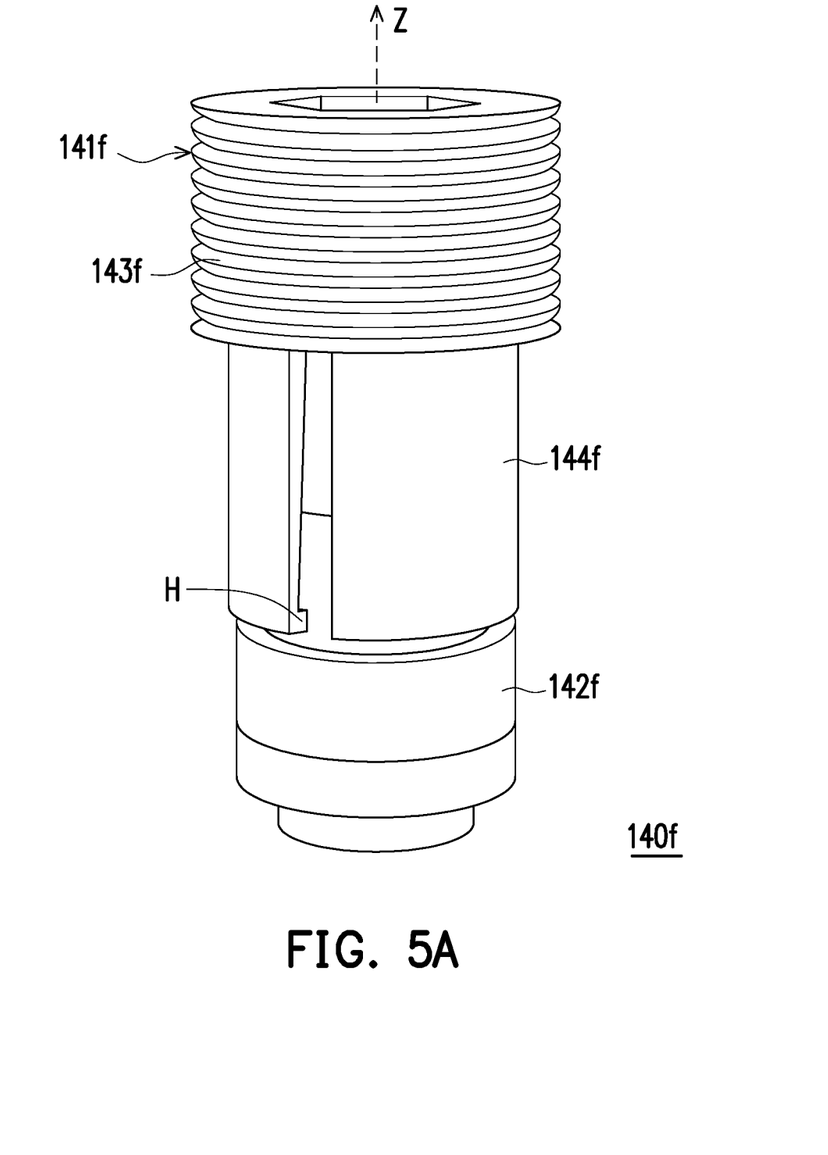
FIG. 5A is a schematic view showing combination of components of the force sensor in another embodiment of the disclosure.
Figure 5B:
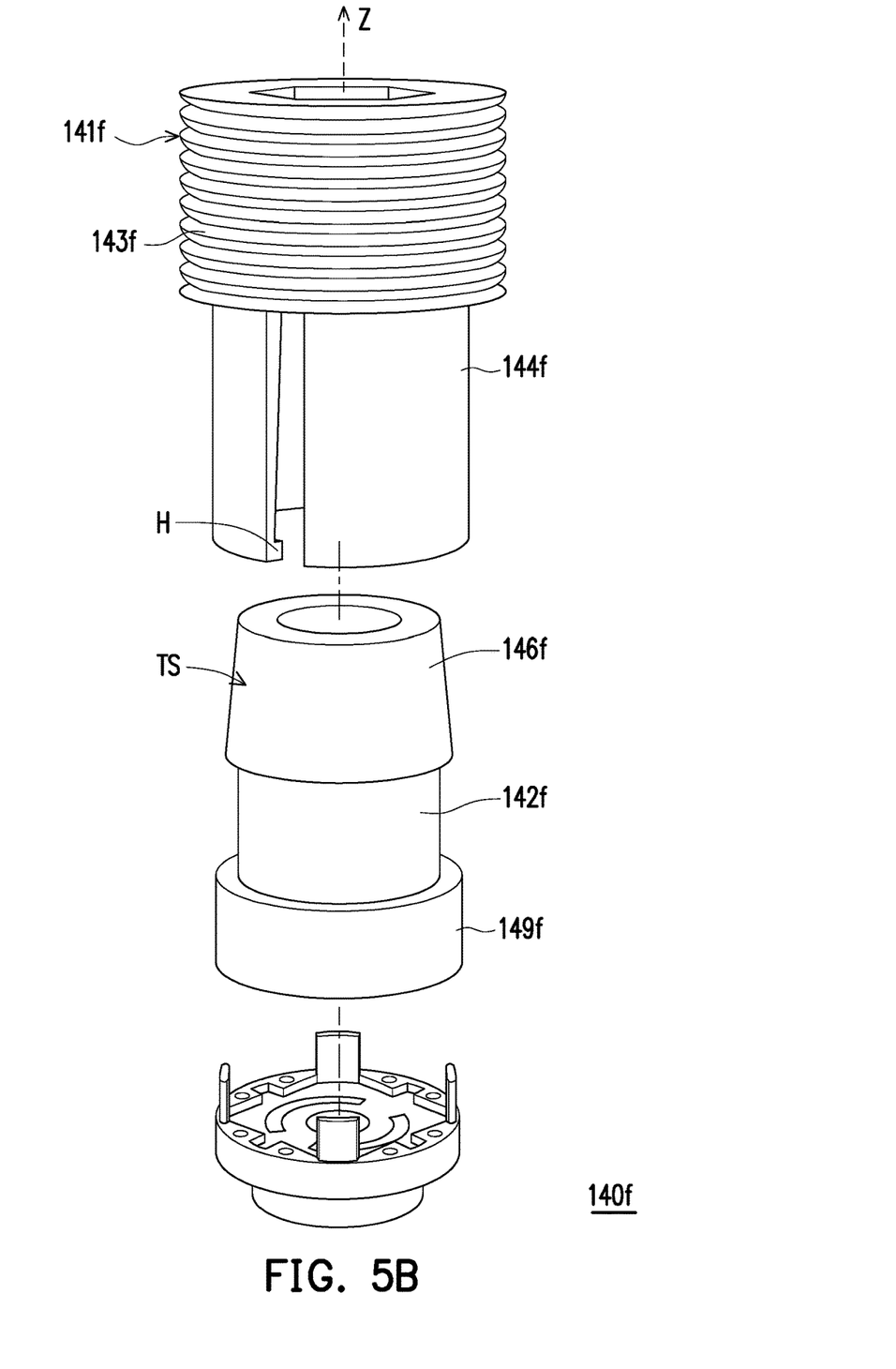
FIG. 5B is a schematic exploded view of the components of the force sensor in FIG. 5A.

FIG. 5A is a schematic view showing the force sensor in another embodiment of the disclosure. FIG. 5B is a schematic exploded view of the force sensor in FIG. 5A.

Referring to FIG. 4B, FIG. 5A and FIG. 5B, a force sensor 140f of the present embodiment has similar structure as that of the force sensor 140e of FIG. 4B. The difference between the two structures is that a plurality of stoppers H are disposed in the plurality of expanding portions 144f of the stationary base 141f. The tightening portion 146f of the elastic component 142f has an inclined surface TS for guiding the stopper H of the plurality of expanding portions 144f to push the connecting portion 149f of the elastic component 142f, so that the stationary base 141f can be coupled with the tightening portion 146f of the elastic component 142f. In the embodiment, the displacement restraint 143f on the stationary base 141f is a thread.

Referring to FIG. 1A and FIG. 1B, in practical application, the motor thrust L converted from the torque of the motor is applied on the ball screw 100 with the force sensor in radial direction. The motor thrust L is transmitted in the screw nut 120 along the axial direction X without generating a component force along the radial direction Z. Relatively, the component force Fz of the preload F in the ball screw 100 having the force sensor in radial direction is transmitted along the radial direction Z, so that the force sensor 140a installed in the screw nut 120 can sense a plurality of the component forces Fz transmitted along the radial direction. Since the force sensing direction of the force sensor 140a is perpendicular to the transmitting direction of the motor thrust L, the force sensor 140a can correctly sense a plurality of the component forces Fz of the preload F without the effect of the motor thrust L. Further, in order to accurately measure the component force Fz of the preload F, the contact end of the elastic component of the force sensor 140a contacts the radial surface in the cavity of the screw nut 120, and the stationary base of the force sensor 140a is fixed in the screw nut 120, thereby preventing the stationary base from being displaced in radial direction.

To sum up, in the disclosure, the ball screw with force sensor in radial direction can be used to sense the magnitude of sum of the component forces of the preload in radial direction, thereby obtaining an accurate preload value. The ball screw with force sensor in radial direction of the disclosure can avoid measured preload value to be effected by the axial motor thrust, thereby improving the accuracy of preload measurement. Further, the force sensor of the ball screw with force sensor in radial direction of the disclosure includes a stationary base and an elastic portion. The stationary base fixes the force sensor in the screw nut to prevent the stationary base from being displaced in radial direction. Hence, the strain sensor disposed on the elastic component can sense the preload in radial direction accurately. In addition, the force sensor can continuously monitor the preload applied on the ball screw to prevent the damage due to installation mistakes of the ball screw, so that the service life of the ball screw can be prolonged and the maintenance cost of the ball screw can be reduced.

It will be apparent to those skilled in the art that various modifications and variations can be made to the structure of the disclosed embodiments without departing from the scope or spirit of the disclosure. In view of the foregoing, it is intended that the disclosure covers modifications and variations of this disclosure provided they fall within the scope of the following claims and their equivalents.

What is claimed is:
1. A ball screw with force sensor in radial direction, comprising:
 a screw rod, an outer surface of the screw rod having an outer groove and the screw rod extending along an axial direction;
 a screw nut, an inner surface of the screw nut having an inner groove and the screw nut having a cavity, wherein the cavity extends along a radial direction from an outer surface of the screw nut, the screw nut being sleeved on the screw rod such that the screw nut is movable along the axial direction;
 a plurality of balls, disposed between the outer groove and the inner groove; and
 a force sensor, disposed in the cavity and comprising:
  a stationary base, comprising:
   a displacement restraint; and
  an elastic component, comprising:
   a contact end, contacting a bottom surface of the cavity; and
   a fixed end, connected to the stationary base;
  at least one strain sensor, disposed on the elastic component;
 wherein the displacement restraint is coupled to the cavity to prevent the stationary base from being displaced in the radial direction, and the elastic component is surrounded by a space disposed in the cavity.

2. The ball screw with force sensor in radial direction according to claim 1, wherein a stiffness of the stationary base along the radial direction is greater than a stiffness of the elastic component along the radial direction.

3. The ball screw with force sensor in radial direction according to claim 2, wherein the stationary base and the elastic component are made of the same material, and the stationary base and the elastic component are an integrally molded structure.

4. The ball screw with force sensor in radial direction according to claim 1, wherein the displacement restraint is an external thread and a side surface of the cavity has an internal thread, the external thread is coupled to the internal thread to prevent the stationary base from being displaced in the radial direction, thereby fixing the stationary base in the cavity.

5. The ball screw with force sensor in radial direction according to claim 1, wherein the displacement restraint is a stopper, and when the displacement restraint is coupled to the cavity, the stopper contacts the outer surface of the screw nut.

6. The ball screw with force sensor in radial direction according to claim 1, wherein the stationary base further comprises at least one rotary restraint, the at least one rotary restraint is coupled to the elastic component to prevent the elastic component from rotating along the radial direction.

7. The ball screw with force sensor in radial direction according to claim 6, wherein the at least one rotary restraint comprises at least one gap.

8. The ball screw with force sensor in radial direction according to claim 6, wherein the at least one rotary restraint comprises at least one through hole.

9. The ball screw with force sensor in radial direction according to claim 6, wherein the at least one rotary restraint comprises at least one blind hole.

10. The ball screw with force sensor in radial direction according to claim 6, wherein the elastic component further comprises at least one tightening portion, and the stationary base further comprises a plurality of expanding portions, when the elastic component is coupled to the stationary base, the at least one tightening portion pushes at least one of the plurality of expanding portions such that the expanding portions press against a side surface of the cavity.

11. The ball screw with force sensor in radial direction according to claim 10, wherein the plurality of expanding portions are a plurality of pillars extending along the radial direction and each of the at least one tightening portion is a structure having an inclined surface and extended in the radial direction, at least one gap is formed between any two adjacent pillars, and when the stationary base is coupled with the elastic component, the structure having the inclined surface pushes the pillars, such that the pillars are expanded outward to press against one side surface of the cavity.

12. The ball screw with force sensor in radial direction according to claim 1, wherein the at least one strain sensor comprises at least one first strain sensor and at least one second strain sensor, the first strain sensor is disposed in a first region of the elastic component, the second strain sensor is disposed in a second region of the elastic component, and when the screw nut is subjected to a preload, a radial strain value of the first region is greater than a radial strain value of the second region.

13. The ball screw with force sensor in radial direction according to claim 12, wherein the first region is a hollow portion of the elastic component, and the second region is a solid portion of the elastic component.

14. The ball screw with force sensor in radial direction according to claim 13, further comprising at least one temperature sensor, wherein the at least one temperature sensor is disposed on the solid portion of the elastic component.

15. The ball screw with force sensor in radial direction according to claim 12, wherein the elastic component further comprises a sensing portion, the first region is a circular region at the sensing portion, the second region is a plurality of annular regions at the sensing portion.

16. The ball screw with force sensor in radial direction according to claim 15, further comprising at least one temperature sensor, wherein the sensing portion further comprises at least one pillar structure, the at least one temperature sensor is disposed on the at least one pillar structure.

17. A ball screw with force sensor in radial direction, comprising:
a screw rod, an outer surface of the screw rod having an outer groove and the screw rod extending along an axial direction;
a screw nut, an inner surface of the screw nut having an inner groove and the screw nut having a cavity, wherein the cavity extends along a radial direction from an outer surface of the screw nut, the screw nut being sleeved on the screw rod such that the screw nut is movable along the axial direction;
a plurality of balls, disposed between the outer groove and the inner groove; and
a force sensor, disposed in the cavity and comprising:
a stationary base, comprising:
a displacement restraint; and
a plurality of expanding portions;
an elastic component, comprising:
a contact end, contacting a bottom surface of the cavity;
a fixed end, connected to the stationary base; and
at least one tightening portion; and
at least one strain sensor, disposed on the elastic component;
wherein the displacement restraint is coupled to the cavity to prevent the stationary base from being displaced in the radial direction, the elastic component is surrounded by a space disposed in the cavity, and when the elastic component is coupled to the stationary base, the at least one tightening portion pushes the plurality of expanding portions, such that the plurality of expanding portions press against one side surface of the cavity.

18. The ball screw with force sensor in radial direction according to claim 17, wherein a stiffness of the stationary base along the radial direction is greater than a stiffness of the elastic component along the radial direction.

19. The ball screw with force sensor in radial direction according to claim 18, wherein the stationary and the elastic component are made of the same material, and the stationary base and the elastic component are an integrally molded structure.

20. The ball screw with force sensor in radial direction according to claim 17, wherein the displacement restraint is an external thread and a side surface of the cavity has an internal thread, the external thread is coupled to the internal thread to prevent the stationary base from being displaced in the radial direction, thereby fixing the stationary base in the cavity.

21. The ball screw with force sensor in radial direction according to claim 17, wherein the displacement restraint is a stopper, and when the displacement restraint is coupled to the cavity, the stopper contacts the outer surface of the screw nut.

22. The ball screw with force sensor in radial direction according to claim 17, wherein the expanding portions are a plurality of pillars extending along the radial direction and each of the at least one tightening portion is a structure having an inclined surface and extended in the radial direction, at least one gap is formed between any two adjacent pillars, and when the stationary base is coupled with the elastic component, the structure having the inclined surface pushes the pillars, such that the pillars are expanded outward to press against one side surface of the cavity.

23. The ball screw with force sensor in radial direction according to claim 17, wherein the at least one strain sensor comprises at least one first strain sensor and at least one second strain sensor, the first strain sensor is disposed in a first region of the elastic component, the second strain sensor is disposed in a second region of the elastic component, and when the screw nut is subjected to a preload, a radial strain value of the first region is greater than a radial strain value of the second region.

24. The ball screw with force sensor in radial direction according to claim 23, wherein the first region is a hollow portion of the elastic component, and the second region is a solid portion of the elastic component.

25. The ball screw with force sensor in radial direction according to claim 24, further comprising at least one temperature sensor, wherein the at least one temperature sensor is disposed on the solid portion of the elastic component.

26. The ball screw with force sensor in radial direction according to claim 23, wherein the elastic component further comprises a sensing portion, wherein the first region is a circular region at the sensing portion, the second region is a plurality of annular regions at the sensing portion.

27. The ball screw with force sensor in radial direction according to claim 26, further comprising at least one temperature sensor, wherein the sensing portion further comprises at least one pillar structure, the at least one temperature sensor is disposed on the at least one pillar structure.

28. A ball screw with force sensor in radial direction, comprising:
a screw rod, an outer surface of the screw rod having an outer groove and the screw rod extending along an axial direction;
a screw nut, sleeved on the screw rod such that the screw nut is movable along the axial direction, wherein an inner surface of the screw nut has an inner groove and the screw nut has a cavity, the cavity extends along a radial direction from an outer surface of the screw nut, the cavity comprises a side surface and a bottom surface, wherein the side surface has an internal thread;
a plurality of balls, disposed between the outer groove and the inner groove; and
a force sensor, disposed in the cavity, comprising:
   a stationary base, comprising:
      at least one displacement restraint, the displacement restraint being an external thread;
      at least one rotary restraint; and
      a plurality of expanding portions;
   an elastic component, comprising:
      a contact end, contacting the bottom surface;
      a fixed end, connected to the stationary base; and
      at least one tightening portion; and
   at least one strain sensor, disposed on the elastic component;
wherein the elastic component is surrounded by a space disposed in the cavity, a stiffness of the stationary base along the radial direction is greater than a stiffness of the elastic component along the radial direction, the external thread is coupled to the internal thread to prevent the stationary base from being displaced in the radial direction, when the elastic component is coupled to the stationary base, the at least one rotary restraint is coupled to the elastic component to prevent the elastic component from rotating along the radial direction, and the at least one tightening portion pushes at least one of the plurality of expanding portions, such that the plurality of expanding portions press against the side surface of the cavity.

29. The ball screw with force sensor in radial direction according to claim 28, wherein the at least one rotary restraint comprises at least one gap.

30. The ball screw with force sensor in radial direction according to claim 29, wherein the plurality of expanding portions are a plurality of pillars extending along the radial direction and each of the at least one tightening portion is a structure having an inclined surface and extended in the radial direction, at least one gap is formed between any two adjacent pillars, and when the stationary base is coupled with the elastic component, the structure having the inclined surface pushes the pillars, such that the pillars are expanded outward to press against one side surface of the cavity.

31. The ball screw with force sensor in radial direction according to claim 28, wherein the at least one strain sensor comprises at least one first strain sensor and at least one second strain sensor, the first strain sensor is disposed in a first region of the elastic component, the second strain sensor is disposed in a second region of the elastic component, and when the screw nut is subjected to a preload, a radial strain value of the first region is greater than a radial strain value of the second region.

32. The ball screw with force sensor in radial direction according to claim 31, wherein the first region is a hollow portion of the elastic component, and the second region is a solid portion of the elastic component.

33. The ball screw with force sensor in radial direction according to claim 32, further comprising at least one temperature sensor, wherein the at least one temperature sensor is disposed on the solid portion of the elastic component.

34. The ball screw with force sensor in radial direction according to claim 31, wherein the elastic component further comprises a sensing portion, wherein the first region is a circular region at the sensing portion, the second region is a plurality at annular regions at the sensing portion.

35. The ball screw with force sensor in radial direction according to claim 34, further comprising at least one temperature sensor, wherein the sensing portion further comprises at least one pillar structure, the at least one temperature sensor is disposed on the at least one pillar structure.

* * * * *